(No Model.)
W. W. CAREY.
WOOD RIM PULLEY.
No. 250,421.  Patented Dec. 6, 1881.
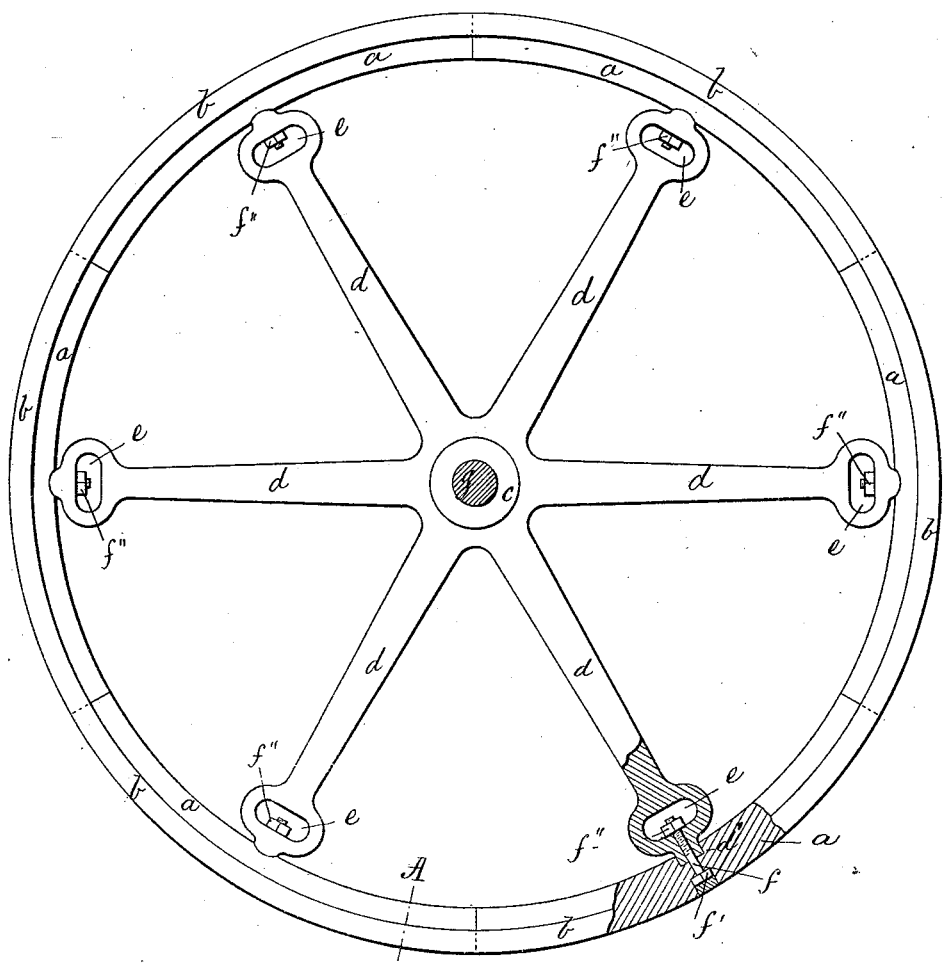
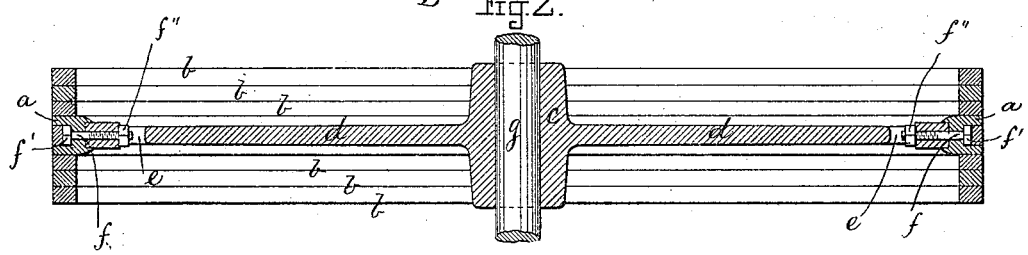
Witnesses.
Henry Chadbourn.
F. Allen.
Inventor.
Wilson W. Carey
by Alvan Gudrein

UNITED STATES PATENT OFFICE.

WILSON W. CAREY, OF LOWELL, MASSACHUSETTS.

WOOD-RIM PULLEY.

SPECIFICATION forming part of Letters Patent No. 250,421, dated December 6, 1881.

Application filed November 3, 1881. (No model.)

*To all whom it may concern:*

Be it known that I, WILSON W. CAREY, a citizen of the United States, residing at Lowell, in the county of Middlesex and State of Massachusetts, have invented certain new and useful Improvements in Wood-Rim Pulleys; and I do hereby declare that the same are fully described in the following specification and illustrated in the accompanying drawings.

The invention is fully represented in the accompanying drawings, in which Figure 1 represents a side elevation, and Fig. 2 a longitudinal section, of my improved wood-rim pulley. Fig. 3 represents a cross-section of the rim on the line A B. (Shown in Fig. 1.)

Similar letters refer to similar parts wherever they occur on the different parts of the drawings.

The improved pulley consists of the middle felly, $a\ a\ a$, made in segments, preferably of hard wood, to which the side fellies, $b\ b\ b$, are secured by glue and nails, brads, or screws. The center felly, $a\ a$, is made to project inwardly beyond the side fellies, $b\ b\ b$, so as to serve as a stiffening-rim, and also to serve for securing to it the central metallic spider, which is composed of hub $c$ and its radial arms $d\ d\ d$, the latter being each provided in their ends with a lateral perforation or eye, $e$, as shown in Fig. 1. Each radial arm $d$ is secured to its segmental middle felly, $a$, by means of a screw-bolt, $f$, having head $f'$ and nut $f''$, as shown, which bolt is inserted from the outside of the middle felly-piece, $a$, through a hole therein, and passes through a radial perforation in the end of the arm $d$, to which it is firmly secured by means of the nut $f''$, located within the eye $e$, as shown in the drawings. The extreme outer end of each radial arm $d$, I prefer to terminate as a projection, $d'$, which is let into the middle felly, $a$, as shown in Figs. 1 and 2; but this is not absolutely necessary, and such projection may be dispensed with if so desired.

It will be seen that in my improved pulley I employ only one fastening-bolt for each radial arm of the spider, and the axial line of such bolt coincides with that of its radial arm, and consequently the strain on the fastening-bolts is directed in a line with their corresponding radial arms, and converging in the axis of the shaft $g$, by which arrangement a uniform tension is obtained on all parts of the pulley, preventing side strain of any kind, and increasing the strength and durability of the pulley, at the same time as its weight is reduced very considerable—a very desirable object to be obtained, particularly in pulleys of large diameters.

The radial arms $d\ d$ may be made of cast or wrought iron, and made in one piece with or secured to the central hub and perforated eyes $e$, as may be desired, without departing from the essence of my invention.

What I wish to secure by Letters Patent, and claim, is—

The herein-described improved wood-rim pulley, consisting of a spider having radial arms $d\ d$, terminating in perforated eyes $e\ e$, the middle felly, $a\ a$, secured to each of said eyes by means of a single radial screw-bolt, $f\ f'\ f''$, and having side rims, $b\ b$, as and for the purpose set forth.

In testimony whereof I have affixed my signature in presence of two witnesses.

WILSON W. CAREY.

Witnesses:
ALBAN ANDRÉN,
HENRY CHADBOURN.